(12) United States Patent
Van Leeuwen

(10) Patent No.: US 11,997,602 B2
(45) Date of Patent: May 28, 2024

(54) AUTOMATIC POWER-ON RESTART SYSTEM FOR WIRELESS NETWORK DEVICES

(71) Applicant: SIGNIFY HOLDING B.V., Eindhoven (NL)

(72) Inventor: Franciscus Wilhelmus Adrianus Alphonsus Van Leeuwen, Mierlo (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 329 days.

(21) Appl. No.: 17/622,557

(22) PCT Filed: Jun. 22, 2020

(86) PCT No.: PCT/EP2020/067281
§ 371 (c)(1),
(2) Date: Dec. 23, 2021

(87) PCT Pub. No.: WO2021/001184
PCT Pub. Date: Jan. 7, 2021

(65) Prior Publication Data
US 2022/0361102 A1    Nov. 10, 2022

(30) Foreign Application Priority Data
Jul. 1, 2019 (EP) ..................... 19183531

(51) Int. Cl.
*H05B 47/19* (2020.01)
*H04W 52/02* (2009.01)
*H04W 84/18* (2009.01)

(52) U.S. Cl.
CPC ........ *H04W 52/0229* (2013.01); *H05B 47/19* (2020.01); *H04W 84/18* (2013.01)

(58) Field of Classification Search
CPC ... H04W 52/0229; H04W 84/18; H05B 17/19
See application file for complete search history.

(56) References Cited

U.S. PATENT DOCUMENTS

| | | | |
|---|---|---|---|
| 5,198,985 A * | 3/1993 | Kwon | H05K 13/0486 700/114 |
| 6,904,800 B2 * | 6/2005 | Merwin | G01F 23/243 73/304 R |
| 6,910,638 B2 * | 6/2005 | Fruhauf | G06Q 20/105 235/492 |
| 7,501,946 B2 * | 3/2009 | Lanigan | G07C 9/38 340/541 |
| 7,567,825 B2 * | 7/2009 | Ueno | H04B 1/707 455/574 |

(Continued)

FOREIGN PATENT DOCUMENTS

| | | | |
|---|---|---|---|
| EP | 3010291 A1 * | 4/2016 | ........ H04W 52/0203 |
| WO | WO-2013030715 A1 * | 3/2013 | ........... H04W 24/02 |
| WO | 2018036845 A1 | 3/2018 | |

*Primary Examiner* — Hai V Nguyen

(57) ABSTRACT

The present invention relates to an apparatus and method for automatic detection whether a wirelessly connected network device with a non-network role was powered on/power cycled in a normal manner, such as using a legacy (wall) switch, or after recovery of a power failure. Based on the result of the detection, an expected behavior for end users is selected, so that the connected network device can behave accordingly.

13 Claims, 2 Drawing Sheets

(56) References Cited

U.S. PATENT DOCUMENTS

| | | | | |
|---|---|---|---|---|
| 7,594,609 B2* | 9/2009 | Kotlarsky | .......... | G06K 7/10722 |
| | | | | 235/462.43 |
| 7,708,205 B2* | 5/2010 | Kotlarsky | .......... | G06K 7/10722 |
| | | | | 235/462.15 |
| 8,509,790 B2* | 8/2013 | Christensen | ........ | H04L 65/1101 |
| | | | | 370/406 |
| 8,649,883 B2* | 2/2014 | Lu | .......... | H04L 12/66 |
| | | | | 700/297 |
| 9,264,252 B2* | 2/2016 | Ebrom | .......... | H05B 6/688 |
| 9,594,369 B2* | 3/2017 | Diab | .......... | G05B 19/4185 |
| 9,820,361 B1* | 11/2017 | Turvy, Jr. | .......... | H04L 12/18 |
| 9,883,570 B1* | 1/2018 | Turvy, Jr. | .......... | H05B 47/19 |
| 9,949,350 B2* | 4/2018 | Roquemore, III | .. | H04L 12/4625 |
| 10,009,986 B2* | 6/2018 | Turvy, Jr. | .......... | G08C 17/02 |
| 10,085,328 B2* | 9/2018 | Barna | .......... | H05B 47/19 |
| 10,219,356 B2* | 2/2019 | Barna | .......... | H04L 43/0817 |
| 10,594,131 B2* | 3/2020 | Chen | .......... | H02H 3/334 |
| 10,747,548 B2* | 8/2020 | Vier | .......... | G06F 15/7839 |
| 10,789,074 B2* | 9/2020 | Joshi | .......... | G06F 9/4405 |
| 10,897,790 B2* | 1/2021 | Velev | .......... | H04W 76/27 |
| 11,006,510 B2* | 5/2021 | Krajnc | .......... | F21S 9/02 |
| 11,349,298 B2* | 5/2022 | Chen | .......... | H02H 3/334 |
| 11,398,924 B2* | 7/2022 | Barna | .......... | H05B 45/10 |
| 11,726,184 B2* | 8/2023 | Ferreira | .......... | G01S 7/4815 |
| | | | | 356/4.01 |
| 11,758,624 B2* | 9/2023 | Dolan | .......... | H05B 47/115 |
| | | | | 315/307 |
| 2004/0178278 A1* | 9/2004 | Fruhauf | .......... | G06K 19/07733 |
| | | | | 235/492 |
| 2006/0220847 A1* | 10/2006 | Lanigan | .......... | G07C 9/38 |
| | | | | 340/545.6 |
| 2007/0181689 A1* | 8/2007 | Kotlarsky | .......... | G06K 7/10722 |
| | | | | 235/462.11 |
| 2007/0215706 A1* | 9/2007 | Kotlarsky | .......... | G06K 7/10851 |
| | | | | 235/462.07 |
| 2007/0240173 A1* | 10/2007 | McCoy | .......... | H04L 67/12 |
| | | | | 719/329 |
| 2007/0264962 A1* | 11/2007 | Ueno | .......... | H04B 1/707 |
| | | | | 455/574 |
| 2008/0006698 A1* | 1/2008 | Kotlarsky | .......... | G06K 7/10722 |
| | | | | 235/462.42 |
| 2008/0127325 A1* | 5/2008 | Ebrom | .......... | H04L 12/2803 |
| | | | | 714/E11.202 |
| 2009/0027188 A1* | 1/2009 | Saban | .......... | B60N 2/002 |
| | | | | 340/439 |
| 2009/0046707 A1* | 2/2009 | Smires | .......... | H04M 7/0069 |
| | | | | 370/352 |
| 2009/0103535 A1* | 4/2009 | McCoy | .......... | H05B 6/688 |
| | | | | 370/392 |
| 2009/0132070 A1* | 5/2009 | Ebrom | .......... | H05B 6/688 |
| | | | | 700/90 |
| 2011/0028141 A1* | 2/2011 | Yang | .......... | H04L 1/0026 |
| | | | | 455/422.1 |
| 2011/0066378 A1* | 3/2011 | Lerche | .......... | E21B 43/116 |
| | | | | 702/6 |
| 2013/0028295 A1 | 1/2013 | Hui et al. | | |
| 2013/0138367 A1 | 5/2013 | Boivin et al. | | |
| 2013/0259147 A1* | 10/2013 | Wang | .......... | H04B 7/0617 |
| | | | | 375/260 |
| 2013/0261821 A1* | 10/2013 | Lu | .......... | H04L 12/2836 |
| | | | | 700/289 |
| 2013/0300569 A1* | 11/2013 | Lerche | .......... | E21B 41/0021 |
| | | | | 340/853.2 |
| 2015/0054413 A1* | 2/2015 | Chen | .......... | H05B 45/31 |
| | | | | 315/155 |
| 2015/0256028 A1 | 9/2015 | Suman | | |
| 2016/0006264 A1* | 1/2016 | Alperin | .......... | H04W 52/0216 |
| | | | | 307/104 |
| 2016/0029457 A1* | 1/2016 | Sung | .......... | H05B 47/19 |
| | | | | 315/294 |
| 2017/0170649 A1* | 6/2017 | Chen | .......... | H02H 3/334 |
| 2017/0171950 A1* | 6/2017 | Barna | .......... | H04L 12/2827 |
| 2017/0173262 A1* | 6/2017 | Veltz | .......... | G16H 20/17 |
| 2017/0331322 A1* | 11/2017 | Tuerk | .......... | H05B 47/22 |
| 2017/0366020 A1* | 12/2017 | Brookshire | .......... | H02J 13/00026 |
| 2018/0027633 A1* | 1/2018 | Roquemore, III | .... | H04W 76/10 |
| | | | | 370/254 |
| 2018/0035519 A1* | 2/2018 | Turvy, Jr. | .......... | H05B 47/105 |
| 2018/0103859 A1* | 4/2018 | Provenzano | .......... | A61B 5/0024 |
| 2018/0173666 A1* | 6/2018 | Srivastava | .......... | G06F 13/4027 |
| 2019/0243657 A1* | 8/2019 | Vier | .......... | G06F 9/52 |
| 2019/0243660 A1* | 8/2019 | Joshi | .......... | G06F 9/52 |
| 2019/0354377 A1* | 11/2019 | Tan | .......... | G06F 3/0238 |
| 2020/0008284 A1* | 1/2020 | Krajnc | .......... | F21S 9/02 |
| 2020/0045767 A1* | 2/2020 | Velev | .......... | H04W 8/22 |
| 2020/0284883 A1* | 9/2020 | Ferreira | .......... | G01S 7/4816 |
| 2020/0319324 A1* | 10/2020 | Au | .......... | H04W 48/16 |
| 2021/0028619 A1* | 1/2021 | Chen | .......... | H02H 3/334 |
| 2022/0070766 A1* | 3/2022 | Haque | .......... | H04W 52/0209 |
| 2023/0198602 A1* | 6/2023 | Zeineddine | .......... | H04W 76/19 |
| | | | | 370/329 |

* cited by examiner

AUTOMATIC POWER-ON RESTART SYSTEM FOR WIRELESS NETWORK DEVICES

CROSS-REFERENCE TO PRIOR APPLICATIONS

This application is the U.S. National Phase application under 35 U.S.C. § 371 of International Application No. PCT/EP2020/067281, filed on Jun. 22, 2020, which claims the benefit of European Patent Application No. 19183531.3, filed on Jul. 1, 2019. These applications are hereby incorporated by reference herein.

FIELD OF THE INVENTION

The invention relates to the field of power-on restart systems for wireless network devices, such as—but not limited to—wirelessly connected luminaire devices in Zigbee networks for use in various different applications for home, office, retail, hospitality and industry.

BACKGROUND OF THE INVENTION

The use of wireless networks with smart network devices (e.g., luminaire devices such as smart light bulbs) makes it possible to automatically adjust a non-network function of devices (e.g. lighting, sensing etc.) based on other devices turning on, remotely controlling non-network functions, linking settings of non-network functions to motion detection, etc.

Such wireless networks of smart network devices may be built on top of the ZigBee protocol. ZigBee itself is built on top of a low-power radio network called IEEE 802.15.4.

United States patent U.S. Pat. No. 9,883,570 B1 discloses a protocol for lighting control via a wireless network, wherein a monitor lighting control device receives a state change event message that includes a payload specifying: (i) a state change event of an occupancy, audio, or daylight sensor, or a switch to turn lighting on/off, dim up/down, set scene or the like; (ii) an identifier of a member lighting control device that detected the state change event; and (iii) a lighting control group identifier of a lighting control group that includes the member lighting control device and the monitor lighting control device. The monitor lighting control device transmits an acknowledgement of receipt of the state change event message to the member lighting control device.

Zigbee devices offer reduced power consumption and cost, together with mesh networking capability, which make them suitable for use in large-scale deployments. Examples of application of Zigbee mesh networks include home automation, building automation, retail services, smart energy, and wireless indoor lighting systems.

However, problems have been faced when the network devices are used in areas with unstable power grids and they are cut from power rather frequently, causing the network devices to return to an undesired default state. For markets such as India this is highly problematic, as power cuts are almost a daily occurrence. But even in markets such as the United States or Australia, this leads to issues as power failures happen frequently (in some areas).

In the case of home lighting networks, most of the complaints are from customers that are woken up in the middle of the night, because the power to the luminaire devices was lost and restored. This causes the light to switch on at maximum brightness, waking up people sleeping in that room. Customers also complain that when they are away from home their bulbs have stayed on for a lengthy period of time, due to a power failure.

However, it was a conscious choice to let the network devices start up at a predetermined default state (e.g. 2700K @ full brightness). A reason may be that the network devices are typically not directly mains powered, but via a "legacy" wall switch. By always starting up at the desired default state, the legacy wall switch can still be used to get the network device to produce a functional output (e.g. functional light level). If the network devices would always go to the previous setting (which might be OFF, or at very low brightness, or at a saturated colour in case of a colour capable luminaire device), it would require usage of e.g. an additional application or remote control to let the network device produce the desired functional out after manual switch-on by the wall switch.

SUMMARY OF THE INVENTION

It is an object of the present invention to provide an adaptive restart procedure for network devices in wireless networks.

This object is achieved by an apparatus as claimed in claim 1, by a network device as claimed in claim 11, by a method as claimed in claim 12, and by a computer program product as claimed in claim 13.

According to a first aspect, an apparatus is provided for controlling a restart mode of a network node in a wireless network, wherein the apparatus comprises: a power-up detector for detecting a power-up event of the network node;
- a message detector for detecting a receipt of a wireless power-up message from another network node of the wireless network; and
- a control unit adapted to select one of a plurality of restart modes in dependence on an output of the message detector, in response to a detection of a power-up event by the power-up detector.

According to a second aspect, a network device comprising the apparatus of the first aspect and a non-network function is provided.

According to a third aspect, a method of controlling a restart mode of a network node in a wireless network is provided, wherein the method comprises:
- detecting a power-up event of the network node;
- detecting a receipt of a wireless power-up message from another network node of the wireless network; and
- selecting one of a plurality of restart modes in dependence on received power-up messages, in response to a detected power-up event.

Finally, according to a fourth aspect, a computer program product is provided, which comprises code means for producing the steps of the above method according to the third aspect when run on a computer device.

Accordingly, it can be determined at the network node whether or not the network node has experienced a power-cycle resulting from a power-outage and/or whether or not it is the result of a regular power-cycle, and in line therewith a proper course of action (e.g. restart mode) can be selected. To achieve this, network devices transmit power-up messages when powering on and a concerned network device checks whether there are sufficient of these messages, in which case it was likely a power outage. Based on the result of detection, an expected behavior for end users can be selected, so that the connected network device can behave accordingly.

According to a first option, the plurality of restart modes may at least comprise a safety mode which ensures a proper operation of a non-network function of the network node, which is factory configured and a power failure mode which restores a previous state of the non-network function prior to the power-up event. This ensures that the restart mode automatically selected by the network devices properly matches the expectations of the user.

According to a second option which may be combined with the first option, the network device may be a luminaire device and the non-network function may be a lighting function. Thereby, luminaire devices of lighting networks can be configured to restore a proper and expected lighting behavior in dependence on the reason of a power failure.

According to a third option which may be combined with the first or second option, the control unit may be adapted to initiate a transmission of at least one power-up message to the wireless network in response to the detection of a power-up event by the power-up detector. This measure ensured that other network devices are informed of the power-up event and can determine whether a concurrent power-up event at their location is the result of a user-intended switch-on or an unintended power failure.

According to a fourth option which can be combined with any of the first to third options, the control unit may be adapted to select a power failure mode if the output of the message detector indicates that a predetermined number of power-up messages has been received within a predetermined time period. The predetermined number can be selected based on the local environment of the network device to ensure that a reliable discrimination between an intentional switch-off and an unintentional power failure can be made.

According to a fifth option which can be combined with any of the first to fourth options, the control unit may be adapted to restore a previous state of a non-network function of the network device prior to the power-up event, when the power failure mode is selected. This measure ensures that an expected state of non-network function of the network device is restored in case of a power-up event after an unintentional power failure.

According to a sixth option which can be combined with any of the first to fifth options, the power-up message may be selected from a ZigBee link status massage, a ZigBee device announce message, a ZigBee inter-PAN broadcast or unicast message, a ZigBee broadcast message, a ZigBee multicast message, a ZigBee unicast message and a raw 802.15.4 message sent to all previously known neighbor devices. Thus, the proposed solution may easily be implemented in ZigBee networks based on available types of messages.

According to a seventh option which can be combined with any of the first to sixth options, the message detector may be adapted to distinguish between different sending network nodes by a source address or other identifier included in the power-up message. Thereby, reliability can be increased, since only such power-up messages are considered, that are received from different other networks nodes.

According to an eighth option which can be combined with any of the first to seventh options, the message detector may be adapted to ignore a power-up message with at least one of a signal quality or strength above a predetermined threshold, a transmitter identifier that indicates a network device locate between the same light switch as the network node, and an identifier that indicates the same light switch group as the network node. Thereby, reliability can be further increased, since only such power-up messages are considered, that are likely to be received from other networks nodes not connected to the same light switch.

According to a ninth option which can be combined with any of the first to eighth options, the control unit may be adapted to ignore a power-up message received from another network node based on a previous behavior of that other network node in comparison to the network node. Thereby, reliability can be further increased, since only such power-up messages are considered, that are likely to be received from other networks nodes not connected to the same light switch.

According to a tenth option which can be combined with any of the first to ninth options, the power-up message may comprise information about a type or role of device (e.g. luminaire device, sensor device, bridge device etc.) that has transmitted the power-up message. Thereby, reliability can be further increased, since only such power-up messages are considered, that are likely to be the result of the same cause of power outage.

According to an eleventh option which can be combined with any of the first to tenth options, the message detector may be adapted to detect a power failure report received by the network device. Thereby, reliability can be further increased, since other relevant types messages are considered, that indicate a power outage.

It is noted that the above apparatus may be implemented based on discrete hardware circuitries with discrete hardware components, integrated chips, or arrangements of chip modules, or based on signal processing devices or chips controlled by software routines or programs stored in memories, written on a computer readable media, or downloaded from a network, such as the Internet.

It shall be understood that the apparatus of claim 1, the network device of claim 11, the method of claim 12, and the computer program product of claim 13 may have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Embodiments of the present invention are now described based on a wireless lighting network as an example of a wireless network and luminaire devices as an example of wirelessly controlled network devices.

Typically, energy is generated and transported to the home. In the home, there is a main fuse box, and electric equipment may be connected directly to the home mains net, but often, especially for bulbs, they are wired behind a mains (light) switch. This light switch is often located close to the entrance of a room, to make it easy for people walking in or out of the room to switch lights on and off.

Figure 1:
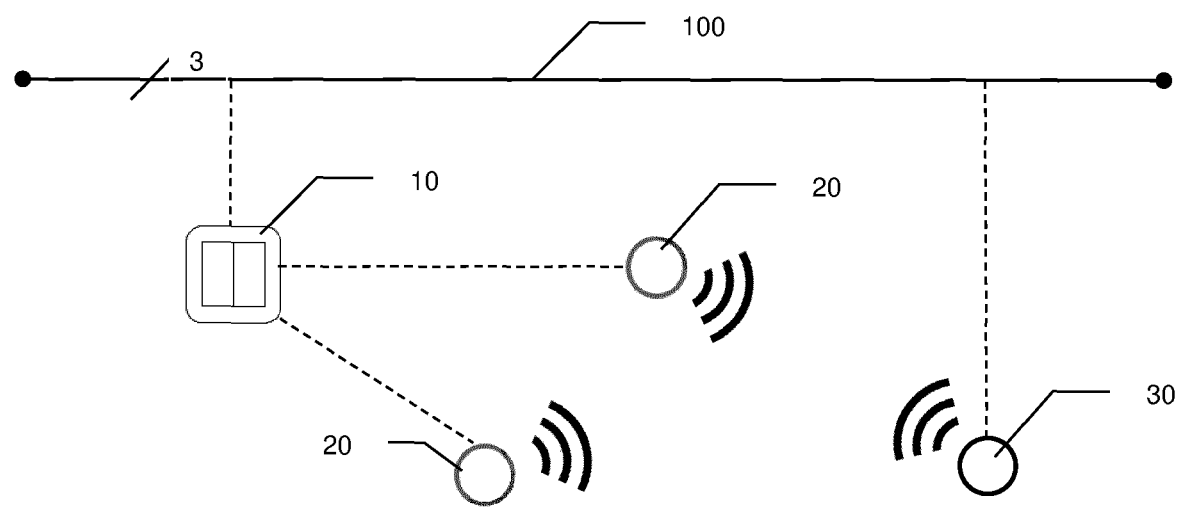
FIG. 1 shows schematically a schematic system architecture of a wireless lighting network.

FIG. 1 shows schematically an architecture of a multi-hop lighting network in which various embodiments can be implemented. The network comprises at least one luminaire device 20, 30 (e.g. a smart lamp such as a light emitting diode (LED) based lamp, gas-discharge lamp or filament bulb, plus any associated support, casing or other such housing) arranged to emit illumination into an environment. The environment may be an indoor space such as one or more rooms and/or corridors of a building; or an outdoor space such as a park, garden, road, or outdoor parking area; or a partially covered space such as a stadium, structured parking facility or gazebo; or any other space such as an interior of a ship, train or other vehicle; or any combination of such possibilities. The luminaire device 20, 30 may take any suitable form such as a ceiling or wall mounted luminaire, a free-standing luminaire, a wall washer, a chandelier; or a less conventional form such as embedded lighting built into an item of furniture, a building material such as glass or concrete, or any other surface.

The luminaire devices 20, 30 are equipped with a wireless communication interface allowing them to transmit and receive wireless messages for remote control and/or signaling purposes.

First luminaire devices 30 are wired directly to the main power supply 100, while second luminaire devices 20 are wired to the main power supply 100 via a light switch 10. This allows convenient switch-off of the light by the second luminaire devices 20, although doing that renders the wirelessly controllable second luminaire devices 20 uncontrollable from the lighting system. When the light switch 10 is switched back on, the second luminaire devices 20 are powered again. At that moment, the control unit (e.g. software) in the wirelessly controllable second luminaire devices 20 needs to decide what to do: either assume a user flipped the light switch 10 and therefore needs functional light or revert to the settings the wirelessly controllable second luminaire devices had before the power was cut. This may however be a low dimming level, a saturated color, or even off-state (standby). This is typically not what the user expects when flipping the light switch 10.

However, in other situations where the power is cut, for example a failure in the home's main fuse box, or a generic power outage caused by a problem in generating energy at the power plant or the transportation to the home, the expected behavior may differ. In such cases, it is more useful for the user if the wirelessly controllable luminaire devices 20 would go to the last state they had before the power outage.

According to various embodiments, a restart control function which may be called "User-Defined Start-Up" may be introduced, that lets the user choose what should happen after a power failure.

As an example, users can choose (per light, or may be aggregated per room or home) between:
1. Safety mode: A factory defined mode, for example, full intensity on.
2. Power fail mode: E.g., restore previous state prior to power fail (which could be the off state.
3. Custom mode: E.g., the user can choose a color and/or a dim level that the luminaire will show after power-up.

Power fail mode is mainly intended for markets like India where the power grid is not so stable. But also, many users in the US and EU have complained that "the light does not remember its last state".

However, the power fail mode raises the problem that users can no longer switch a light from a standby state to an on state anymore with the legacy wall switch 10.

This problem can however be overcome by having the wirelessly controllable luminaire devices, with a high level of accuracy, determine whether their power was toggled because of a mains power failure, or because of the user toggling the light switch 10.

According to various embodiments, this can be accomplished by letting the wirelessly controllable luminaire devices transmit a wireless power-up message upon power up. The wirelessly controllable luminaire devices may then also listen for this power-up message for a predetermined amount of time after power-up.

If a wirelessly controllable luminaire device receives such a power-up message within a pre-defined time after power-up (not being transmitted by itself), it knows that other wirelessly controllable luminaire devices were also powered up at the same time, and it assumes it was because of a mains power failure. The wirelessly controllable luminaire device could then e.g. go back to the previous state it was in.

Otherwise, If the wirelessly controllable luminaire device does not receive such a power-up message within this pre-defined time after power-up, it was the only wirelessly controllable luminaire device being powered up at that time, and it assumes it was because of a legacy power switch toggle by a user. The wirelessly controllable luminaire device could then e.g. switch to a default full brightness (e.g. default brightness at e.g. 2700K).

Figure 2:
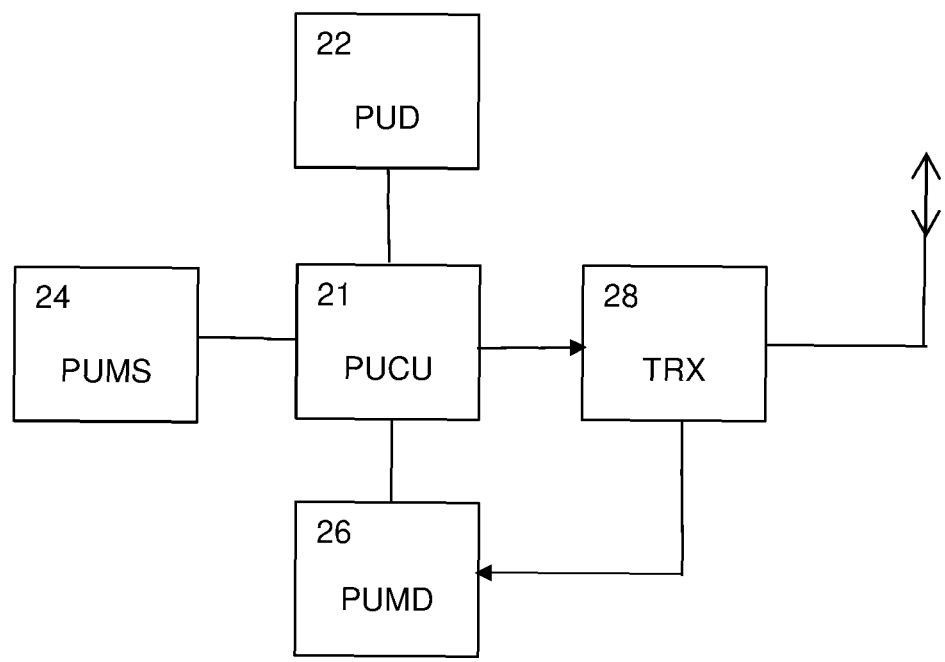
FIG. 2 schematically shows a block diagram of luminaire device according to various embodiments.

FIG. 2 schematically shows a block diagram of a wirelessly controllable network device according to various embodiments. It is noted that only those blocks relevant for the proposed automatic restart function are shown in FIG. 2. Other blocks have been omitted for reasons of brevity.

The network device of FIG. 2 may be one of the wirelessly controllable second luminaire devices 20 in FIG. 1 or any other type of wirelessly controllable network device with a non-network function (e.g. light generation, sensing, controlling, recording, etc.).

According to FIG. 2, the network device comprises a transceiver unit (TRX) 28 for transmitting and receiving wireless messages and/or other wireless signals via an antenna. Power-up messages to be transmitted for automatic restart control are generated by a power-up control unit (PUCU) 21 and supplied, to the transceiver unit 28 for wireless transmission through the network. Furthermore, messages received by the transceiver 28 from other network devices are forwarded to a power-up message detector (PUMD) 26 which is configured to determine a power-up message (e.g. a "Just Started" message) based on predetermined characteristics (e.g., identification pattern or flag).

Furthermore, the network device comprises a power-up detector (PUD) 22 which detects a power-up after a loss of power supply to the network device (e.g. power-off by a user or due to a power failure).

It is noted that both power-up message detector 26 and power up detector 22 may be integrated in the power-up control unit 21, e.g., as dedicated subroutines of a power-up control program.

Based on information obtained from the power-up detector 22 and the power-up message detector 26 or the corresponding subroutines, the power-up control unit 21 controls a power-mode setting unit (PDMS) 24 to set a predetermined power-up mode in accordance with a ground of power loss determined from the information obtained from the power-up detector 22 and the power-up message detector or the corresponding subroutines.

Thereby, an adaptive restart mode after power-up can be automatically selected based on the circumstances of the power loss.

Figure 3:
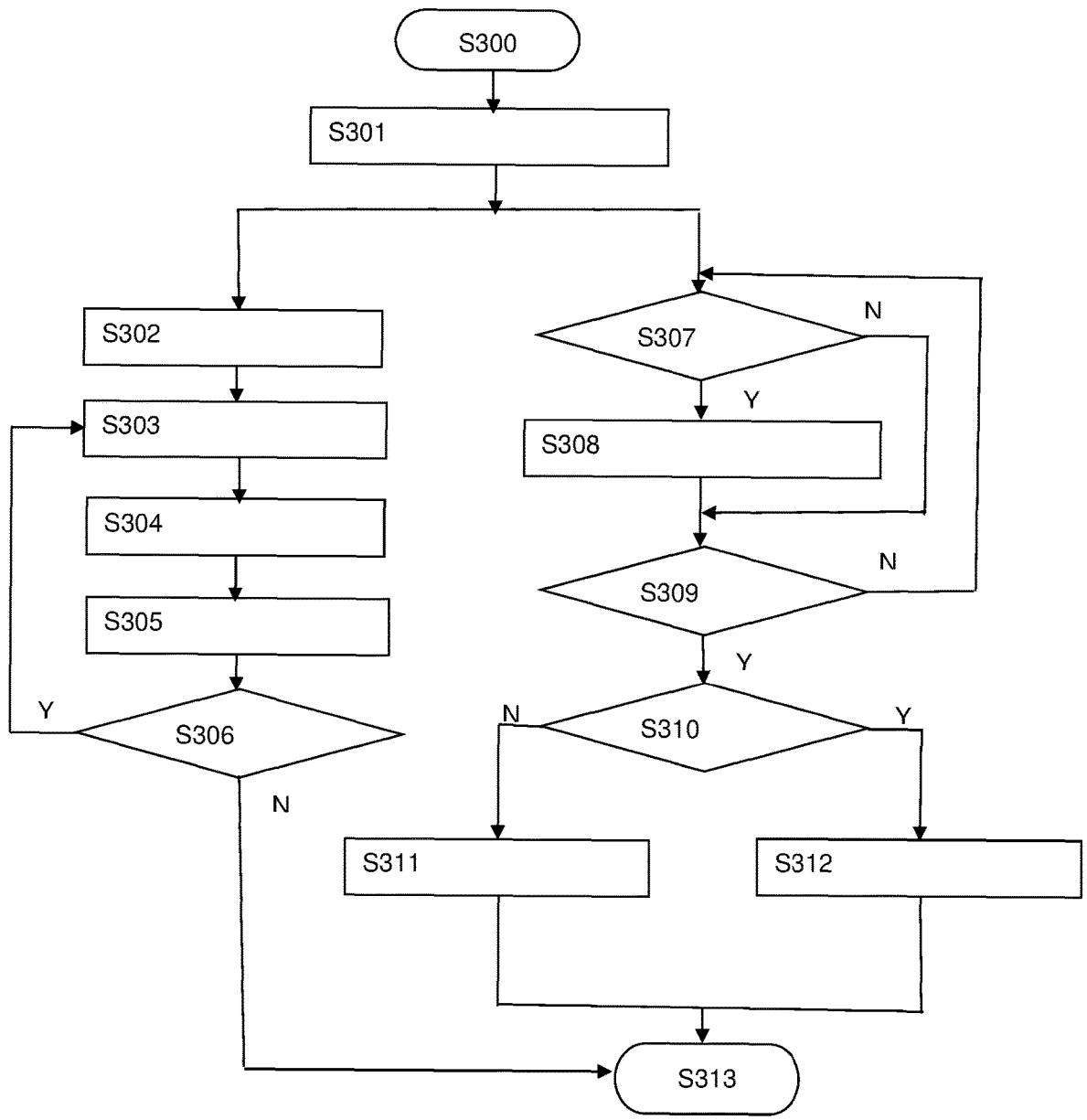
FIG. 3 shows a flow diagram of an automatic power-on restart procedure according to various embodiments.

FIG. 3 shows a flow diagram of an automatic power-on restart procedure according to various embodiments, which may be implemented e.g. in the power-up control unit 20 of FIG. 2.

In step S300, the procedure is started in response to a detection of a power-up situation. Then, in step S301, a radio unit (e.g. the transceiver 28 of FIG. 2) of the network device is enabled to allow transmission and reception of wireless messages to/from the network.

Then, the procedure branches off into a transmission-related branch (steps S302 to S306) and a reception-related branch (steps S307 to S312) which might be processed concurrently or alternately.

In step S302, a transmit counter is set to zero and the procedure proceeds to step S303 where a first power-up message (e.g. "Just Started") is broadcast through the network. Then, in step S304, the transmit counter is incremented by one and a predetermined or random delay period is introduced in step S305. Thereafter, in step S306, the procedure checks whether the value of the transmit counter is below a preset or random number of transmissions. If so, the procedure jumps back to step S303 and a second power-up message is broadcast with a subsequent incrementation of the transmit counter in step S304 and delay period in step S305. This loop of steps S303 to S306 is continued until the procedure determines in step S306 that the value of the transmit counter has reached the preset or random number of transmissions.

If the present number of transmissions of the power-up message have been broadcast, the transmission-related branch of the procedure ends.

Additionally, in the first step S307 of the reception-related branch, the procedure checks whether a power-up message (e.g. "Just Started") has been received from another network device. If so, the procedure continues with step S308 and a receipt counter is incremented by one. Otherwise, if no power-up message has been received from another network device, the procedure jumps to step S309 and checks whether a predetermined start-up time has been reached. If not, the procedure jumps back to step S307 and checks again whether a power-up message has been received meanwhile and increments the receipt counter in the affirmative case.

Moreover, if the receipt counter is not zero, the procedure also checks whether the received message has been received from a new network device and only increments the receipt counter, if a power-up message has been received from another network device, not yet registered so far as having just started up. Thereby, it can be ensured that power-up messages received from different network nodes are counted only.

The loop S307 to S309 is continued until the predetermined start-up time period has been reached. Then, the procedure continues with step S310 and checks whether the receipt counter has reached a preset threshold number of power-up messages. If so, the procedure assumes that a power failure has happened and branches to step S312 where a power-failure start-up mode or behavior is applied. Otherwise, if the preset number of messages has not been reached within the start-up period, the procedure assumes that power has been switched off by a user and branches to step S311 where a legacy-switch start-up mode or behavior is applied.

It is noted that the delay period of step S305, the preset number of step S306, the predetermined start-up time of step S309, and/or the preset threshold number of step S310 could also be calculated based on at least one external factor (e.g. level of interference, received signal quality, total number of network devices or other suitable factors).

Thus, the procedure of FIG. 3 ensures that a preset number of power-up messages are sent by the network device at every power-up situation and that the start-up mode or behavior applied by the network device is made dependent on the number of power-up messages received from other network devices.

The wireless power-up message (e.g. "Just Started") may be a new wireless message created for this purpose or an existing wireless message of the network system, that is re-purposed (e.g. an empty link status message or a device announce message sent by ZigBee devices upon start-up).

As another option, the wireless power-up message (e.g. "Just Started") may be a raw 802.15.4 message or a ZigBee Inter-PAN (Personal Area Network) broadcast message. Although it is an Inter-PAN message, its scope can still be limited to the current PAN by setting the destination PAN identification (ID) to the current network's PAN ID instead of the more typical of setting it to "0xFFFF" (meaning all PANs). Thereby, the Inter-PAN message does not leave the PAN.

Zigbee Inter-PAN messages are not re-transmitted by other nodes while networked messages are re-transmitted by nodes that are in the same network (e.g. PAN).

Further options for the power-up message are a ZigBee Inter-PAN unicast message (sent to all previously known neighbors), a ZigBee broadcast message, a ZigBee multicast message, a ZigBee unicast message (sent to all previously known neighbors). The wireless power-up message (e.g. "Just Started") may be transmitted once at a pre-defined (possibly randomized) time after start-up (i.e. preset number in step S306 of FIG. 3 is one) or may be transmitted multiple times after start-up, with some delay in between. In this case, as indicated above, the receiver needs to distinguish between different senders of the power-up message if the value of the receipt counter is larger than one. This can be done e.g. by including the source address of the sender.

As a further option, network devices that receive the wireless power-up message and know they were not recently power cycled, could send a response message to the sender of the power-up message, indicating that it was not a mains power failure.

In case more than one network device (e.g. wirelessly controllable luminaire device) are connected behind the same legacy light switch (e.g. as depicted in FIG. 1), the preset threshold number of the receipt counter in step S310 should be at least the number of wirelessly controllable luminaire devices behind that light switch minus 1 (e.g. "1" in FIG. 1). This could be achieved in that the user configures the system and indicates which luminaire devices are behind the same legacy light switch. The algorithm is slightly adjusted, such that when a power-up message is received from a luminaire device behind the same legacy light switch, the message is ignored. Therein, the power-up message may contain an identifier of the transmitting network device, and all luminaire devices behind the same legacy light switch are configured such that they know the identifiers of the other lights behind that light switch, or, alternatively, the power-up message contains an identifier of the light switch group.

As a still further option, wirelessly controllable network devices may ignore power-up messages with a signal strength (e.g. RSSI (Received Signal Strength Indication)) above a certain threshold, assuming these messages come from wirelessly controllable network devices that are close (and thus likely part of the same luminaire or light switch group).

As a still further options, wirelessly controllable network devices may detect that certain other wirelessly controllable network devices always power up at the same time as themselves (using the power-up message) and may use that information to ignore the power-up messages received from those.

In more refined embodiments, the wirelessly controlled network device could also enter into a learning mode, wherein it checks which devices report normally (e.g. when a device is in a group). In that case, the network device can determine that it is not an issue if e.g. four other lamps report power-up, but it might be an issue if more than four report power-up.

Alternatively, or additionally, wirelessly controllable network devices could report more information, not only that they just powered up, but also what type of device they belong to. E.g., it is not common that a sensor node reports power-up at the same time as a lighting node does. Additional information or optional fields of the power-up message could be an intermediate counter value of the received power-up messages from the reporting node and/or the switch group to which the reporting node belongs. Such additional information could help in determining the reason for a power failure. Alternatively, or additionally, a second phase could be implemented, where a network device (e.g. a bridge device which is typically not located behind a light switch) that detects a power outage reports this using a further broadcast message, in order to corroborate the finding for other network devices. This option could increase reliability because when this network device was not recently power-cycled, it could respond to the power-up messages by broadcasting a message (e.g. "not a power failure") that indicates that no power failure has occurred. For all above cases, it is also relevant to consider the situation where there is a bridge device with multiple lamps in a mesh, or whether there is just a mesh of peer devices. In the first case, the threshold of the required number of received power-up messages may need to be suitably increased to cover all dependent network devices controlled by the bridge device.

The flowchart in FIG. 3 depicts an embodiment wherein a plurality of "Just started" messages are transmitted per device. As a result, the likelihood of the start-up of the node being registered by other nodes is increased, resulting in a more robust system behavior. This may be particularly relevant when devices have different startup-times and/or utilize randomized delays before transmitting their startup message. However, if the system performance is less critical then a singular transmission per device may be used resulting in a simplified operation. Singular transmissions may be combined with a lower threshold number, allowing for a limited number of collisions of start-up messages. In addition, the likelihood of collisions could be reduced by increasing the duration of the time-window for transmitting startup messages.

To summarize, methods and apparatuses have been described for automatic detection whether a wirelessly connected network device with a non-network role was powered on by using a legacy (wall) switch or after recovery of a power failure. Based on the result of detection, an expected behavior for end users is selected, so that the connected network device can behave accordingly.

While the invention has been illustrated and described in detail in the drawings and foregoing description, such illustration and description are to be considered illustrative or exemplary and not restrictive. The invention is not limited to the disclosed embodiments. The proposed restart control procedures can be applied to and possibly standardized in other types of multi-hop networks and with other types of messages and control fields. Moreover, the invention can be applied in any product that implements a wireless network (e.g. Zigbee or others). The present invention is equally applicable to network devices of any other wireless technology (e.g. BLE, Infrared (IR), near field communication (NFC), wireless local area communication (Wi-Fi), Zigbee PRO, Thread, Zwave, WirelessHART, CityTouch, IP500, other 802.15.4 networks, or also for 802.11 networked devices and any other mesh or tree-based technology).

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. The foregoing description details certain embodiments of the invention. It will be appreciated, however, that no matter how detailed the foregoing appears in the text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

A single unit or device may fulfill the functions of several items recited in the claims. The mere fact that certain measures are recited in mutually different dependent claims does not indicate that a combination of these measures cannot be used to advantage.

The described operations like those indicated in FIG. 3 can be implemented as program code means of a computer program and/or as dedicated hardware of the commissioning device or luminaire device, respectively. The computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. An apparatus for controlling a restart mode of a network node in a wireless network, wherein the apparatus comprises:
   a power-up detector for detecting a power-up event of the network node;
   a message detector for detecting a receipt of a wireless power-up message from another network node of the wireless network; and
   a control unit adapted to select one of a plurality of restart modes, in response to a detection of a power-up event by the power-up detector;
   the control unit further adapted to:
   initiate a transmission of at least one power-up message to the wireless network in response to the detection of a power-up event by the power-up detector; and the selection of the one of the plurality of restart modes is in dependence on an output of the message detector, and wherein a power failure mode is selected if the output of the message detectors indicates that a predetermined number of power-up messages has been received within a predetermined time period.

2. The apparatus of claim 1, wherein the plurality of restart modes at least comprise:
- a safety mode wherein the apparatus is adapted to use a factory setting for a non-network function of the network node; and
- a power failure mode, wherein the apparatus is adapted to restore a previous state of the non-network function prior to the power-up event.

3. The apparatus of claim 2, wherein the network node is a luminaire device and the non-network function is a lighting function.

4. The apparatus of claim 1, wherein the control unit is adapted to restore a previous state of a non-network function of the network node prior to the power-up event, when the power failure mode is selected.

5. The apparatus of claim 1, wherein the power-up message is selected from a ZigBee link status message, a ZigBee device announce message, a ZigBee inter-PAN broadcast or unicast message, a ZigBee broadcast message, a ZigBee multicast message, a ZigBee unicast message and a raw message of the 802.15.4 protocol, and the apparatus is arranged to send the power-up message to all previously known neighbor devices.

6. The apparatus of claim 1, wherein the message detector is adapted to distinguish between different sending network nodes by a source address or other identifier included in the power-up message.

7. The apparatus of claim 1, wherein the message detector is adapted to ignore a power-up message with at least one of a signal quality above a predetermined threshold, a transmitter identifier that indicates a network device located between the same light switch as the network node, and an identifier that indicates the same light switch group as the network node.

8. The apparatus of claim 1, wherein the control unit is adapted to ignore a power-up message received from another network node based on a previous behavior of that other network node in comparison to the network node.

9. The apparatus of claim 1, wherein the power-up message comprises information about a type of device that transmitted the power-up message and the apparatus is arrange to extract the type of device from the power-up message.

10. The apparatus of claim 9, wherein the message detector is adapted to detect a power failure report received by the network node.

11. A network device comprising an apparatus of claim 1 and a non-network function.

12. A method of controlling a restart mode of a network node in a wireless network, wherein the method comprises an apparatus:
- detecting a power-up event of the network node;
- detecting a receipt of a wireless power-up message from another network node of the wireless network;
- selecting one of a plurality of restart modes, in response to a detected power-up event; and
- initiating a transmission of at least one power-up message to the wireless network in response to the detection of a power-up event by the power-up detector; and
- wherein the selecting of the one of the plurality of restart modes is in dependence on an output of the message detection, and wherein a power failure mode is selected if the output of the message detection indicates that a predetermined number of power-up messages has been received within a predetermined time period.

13. A non-transitory computer readable medium storing instructions when executed by one or more processor causes the one or more processors to perform the method of claim 12 for controlling a restart mode of a network node.

* * * * *